(12) United States Patent
Seon et al.

(10) Patent No.: US 9,173,135 B2
(45) Date of Patent: Oct. 27, 2015

(54) PROVIDING SERVICE CONTINUITY BETWEEN HETEROGENEOUS WIRELESS NETWORKS

(71) Applicant: KT CORPORATION, Gyeonggi-do (KR)

(72) Inventors: Yong-Mun Seon, Gyeonggi-do (KR); Ki-Sub Choe, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 111 days.

(21) Appl. No.: 13/789,926

(22) Filed: Mar. 8, 2013

(65) Prior Publication Data

US 2014/0036866 A1 Feb. 6, 2014

(30) Foreign Application Priority Data

Aug. 6, 2012 (KR) .................. 10-2012-0085750

(51) Int. Cl.
*H04W 36/00* (2009.01)
*H04W 48/18* (2009.01)
*H04W 60/00* (2009.01)

(52) U.S. Cl.
CPC .......... *H04W 36/0022* (2013.01); *H04W 48/18* (2013.01); *H04W 60/00* (2013.01)

(58) Field of Classification Search
None
See application file for complete search history.

(56) References Cited

U.S. PATENT DOCUMENTS

| | | | | |
|---|---|---|---|---|
| 8,306,537 | B2 * | 11/2012 | Burbidge et al. | 455/436 |
| 8,626,159 | B2 * | 1/2014 | Noguchi et al. | 455/433 |
| 8,744,437 | B2 * | 6/2014 | Zhu et al. | 455/433 |
| 8,792,417 | B2 * | 7/2014 | Yeoum et al. | 370/328 |
| 8,830,844 | B2 * | 9/2014 | Mathias et al. | 370/242 |
| 2010/0098023 | A1 * | 4/2010 | Aghili et al. | 370/331 |
| 2010/0130204 | A1 * | 5/2010 | Kanauchi et al. | 455/435.1 |
| 2012/0106324 | A1 * | 5/2012 | Keller et al. | 370/225 |
| 2013/0301466 | A1 * | 11/2013 | Nenner | 370/252 |

* cited by examiner

*Primary Examiner* — Donald Mills
(74) *Attorney, Agent, or Firm* — IP Legal Services, LLC (57) ABSTRACT

The disclosure is related to providing service continuity between heterogeneous networks in user equipment. A first cell change procedure may be performed from a packet switched network to a circuit switched network in a first idle mode. Availability of a packet switched domain of the circuit switched network may be determined. A location area update (LAU) may be initiated when a packet switched domain of the circuit switched network is barred.

20 Claims, 7 Drawing Sheets

PROVIDING SERVICE CONTINUITY BETWEEN HETEROGENEOUS WIRELESS NETWORKS

CROSS REFERENCE TO PRIOR APPLICATIONS

The present application claims priority under 35 U.S.C. §119 to Korean Patent Application No. 10-2012-0085750 (filed on Aug. 6, 2012), which is hereby incorporated by reference in its entirety.

FIELD OF THE INVENTION

The present invention relates to communication and, in particular, to providing service continuity between heterogeneous wireless networks.

BACKGROUND OF THE INVENTION

In a heterogeneous wireless network environment, various wireless networks use different telecommunication technologies. For example, heterogeneous wireless networks may include a global system for mobiles (GSM) network, a wideband code division multiple access (WCDMA) network, and/or a Long Term Evolution (LTE) network, Each of the WCDMA network and/or GSM network supports both a circuit switched (CS) service and a packet switched (PS) service. However, the LTE network is a wireless communication network which delivers information at a high data transmission rate with low latency, and supports only a packet switched (PS) service. In the LTE network, a CS service (e.g., voice call service) may be provided through a circuit switched (CS) fallback and/or an internet protocol multimedia subsystem (IMS). Herein, the CS fallback may provide CS services such as voice call services, short message services (SMS), location services (LCS), and/or unstructured supplementary service data (USSD) by reuse of the WCDMA and/or GSM networks when user equipment (UE) is served by the LTE network. The CS fallback is available when a LTE service coverage is overlapped with a service coverage of the WCDMA network or the GSM network.

Typically, when UE supporting an LTE technology and a WCDMA/GSM technology redirects from an LTE network to a WCDMA/GSM network, UE may perform a location area update (LAU) or a routing area update (RAU) such as a normal routing area update (normal RAU) or a combined RAU.

However, when a cell change procedure (i.e., inter-radio access technology (Inter-RAT) cell change procedure) due to a cell reselection is performed from the LTE network to the WCDMA/GSM network, a PS domain of the WCDMA/GSM network may have already been barred. In this case, UE may not be able to perform a normal location update procedure. Accordingly, the UE present in the WCDMA/GSM network may not be able to receive paging signals from the WCDMA/GSM network since a position of the UE is not known to the WCDMA/GSM network. Further, the UE holds a temporary identity used in the next update (TIN) value being set to a GUTI value even though the UE is back to the LTE network.

Meanwhile, when an Inter-RAT cell change procedure due to CS fallback is performed from the LTE network to the WCDMA/GSM network, the PS domain of the WCDMA/GSM network may have already been barred. Thereafter, UE may be transferred back to the LTE network by a cell reselection procedure. In this case, the UE typically holds a TIN value being set to a GUTI value, and therefore the UE may not be able to perform a tracking area update (TAU). Therefore, the UE may not be able to receive paging signals from the LTE network.

Accordingly, there is a need to ensure service continuity between such different types of networks in heterogeneous wireless network environment by avoiding a loss of paging signals.

SUMMARY OF THE INVENTION

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, user equipment may provide service continuity between heterogeneous wireless networks in order to avoid a loss of paging signals.

In accordance with an embodiment of the present invention, a method may be provided for providing service continuity between heterogeneous networks accessed by user equipment. The method may include performing a first cell change procedure from a packet switched network to a circuit switched network in a first idle mode, determining availability of a packet switched domain of the circuit switched network, and initiating a location area update (LAU) when the packet switched domain of the circuit switched network is in a barred state.

The packet switched network may be a Long Term Evolution (LTE) network, and the circuit switched network may be at least one of a wideband code division multiple access (WCDMA) network and a global system for mobiles (GSM) network.

The initiating an LAU may include transmitting a location area update request message to a corresponding mobile switching center (MSC).

The determining may be based on a system information block broadcasted from the circuit switched network.

The packet switched domain may be barred by a domain specific access control (DSAC).

The method may further include performing a second cell change procedure from the circuit switched network to the packet switched network in a second idle mode and initiating a tracking area update (TAU).

The initiating a TAU may include transmitting a TAU message to a corresponding mobility management entity (MME).

The method may further include performing a second cell change procedure from the circuit switched network to the packet switched network in a second idle mode, identifying a temporary identity used in next update (TIN), and initiating a tracking area update (TAU) when the TIN has a globally unique temporary identity (GUTI) value.

The initiating a TAU may include transmitting a TAU request message to a corresponding mobility management entity (MME).

In accordance with another embodiment of the present invention, a method may be provided for providing service continuity between heterogeneous networks accessed by user equipment. The method may include performing a first cell change procedure through a circuit switched (CS) fallback from a packet switched network to a circuit switched network, wherein a packet switched domain of the circuit switched network is barred, initiating a registration of the user equipment to a circuit switched domain of the circuit switched network, performing a second cell change procedure from the circuit switched network to the packet switched network in an idle mode, determining whether a trigger condition for a tracking area update (TAU) is satisfied, and initiating the TAU when the trigger condition is satisfied.

The initiating a registration of the user equipment may include transmitting a connection management (CM) service request message to a corresponding mobile switching center (MSC).

The trigger condition may include at least one of: when the packet switched domain of the circuit switched network is barred by a domain specific access control (DSAC), and when a temporary identity used in next update (TIN) has a globally unique temporary identity (GUTI) value.

Whether the packet switched domain is barred may be determined based on a system information block broadcast from the circuit switched network.

The initiating the TAU may include transmitting a TAU message to a corresponding mobility management entity (MME).

In accordance with still another embodiment of the present invention, an apparatus may be provided for providing service continuity between heterogeneous networks. The apparatus may include a cell change unit and a mobility management unit. The cell change unit may be configured to perform a cell change procedure between a packet switched network and a circuit switched network. The mobility management unit may be configured to initiate at least one of a location area update (LAU) and a tracking area update (TAU) when a packet switched domain of the circuit switched network is in a barred state.

The mobility management unit may transmit an LAU request message to a corresponding mobile switching center (MSC) when the cell change procedure is performed in an idle mode from the packet switched network to the circuit switched network.

The mobility management unit may transmit a connection management (CM) service request message to a corresponding mobile switching center (MSC) when the cell change procedure is performed from the packet switched network to the circuit switched network by a circuit switched (CS) fallback.

The mobility management unit may perform the TAU based on a TAU trigger condition when the cell change procedure is performed in an idle mode from the circuit switched network to the packet switched network.

The TAU trigger condition may be satisfied with at least one of: when an routing area update (RAU) is not performed in a packet switched domain of the circuit switched network; and when a temporary identity used in next update (TIN) has a globally unique temporary identity (GUTI) value.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment of the present invention, user equipment (UE) may forcibly initiate at least one of a location area update (LAU) and a tracking area update (TAU) in order to avoid a loss of paging signals targeted to the UE, when a packet switched (PS) domain of a circuit switched network (e.g., a WCDMA network, a GSM network, etc) in a heterogeneous wireless network environment. For example, UE may initiate the LAU by transmitting an LAU request message to a corresponding mobile switching center (MSC), when the UE performs an inter-radio access technology (Inter-RAT) cell change procedure from an LTE network to the WCDMA/GSM network in an idle mode and the PS domain of the WCDMA/GSM network is barred. Further, the UE may initiate the TAU by transmitting a TAU request message to a corresponding mobility management entity (MME) when the UE is transferred back to the LTE network through an Inter-RAT cell change procedure.

Figure 1:
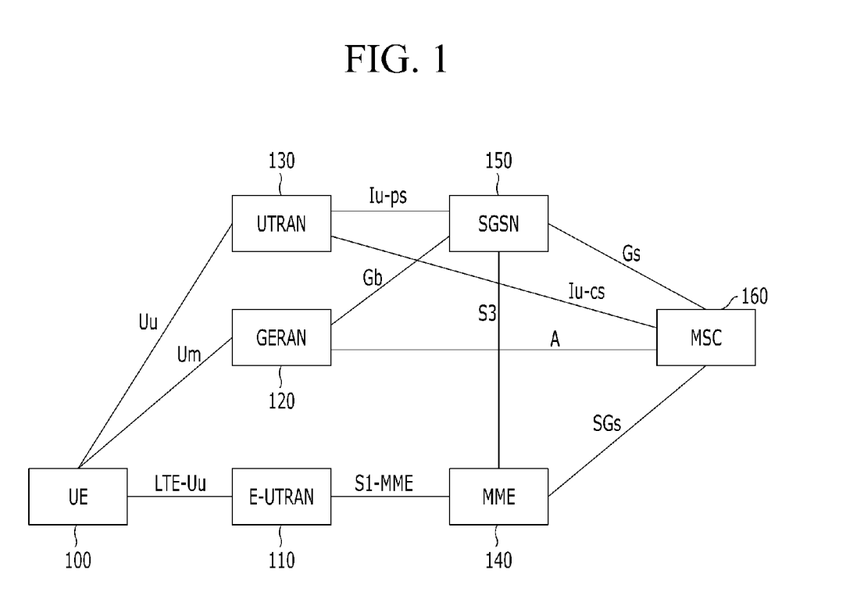
FIG. 1 illustrates a communication network for providing service continuity between heterogeneous wireless networks.

FIG. 1 illustrates a communication network for providing service continuity between heterogeneous wireless networks.

Referring to FIG. 1, the heterogeneous wireless networks may include a Long Term Evolution (LTE) network, a global system for mobiles (GSM) network, and/or a wideband code division multiple access (WCDMA) network. The LTE network may include a plurality of LTE cells governed by corresponding evolved NodeB (eNodeB). The LTE network is also known as an Evolved Universal Mobile Telecommunication System Terrestrial Radio Access Network (E-UTRAN) 110. Further, the GSM network may include a plurality of GSM cells governed by corresponding base transceiver station (BTS). The GSM network is also known as GERAN 120. Furthermore, the WCDMA network may include a plurality of WCDMA cells governed by corresponding NodeB. The WCDMA network is also known as UMTS terrestrial radio access network (UTRAN) 130. Herein, a packet switched network indicates the LTE network, and a circuit switched network indicates the WCDMA network and/or the GSM network.

User equipment (UE) 100 may be connected to a communication network such as E-UTRAN 110, GERAN 120, and/or UTRAN 130. UE 100 may support at least one of a circuit switched (CS) fallback procedure, a combined evolved packet system (EPS)/international mobile subscriber identity (IMSI) attach procedure, a combined tracking area (TA)/routing area (RA) update procedure, a detach procedure, and SMS message sending/receiving procedures, and may include some or all of the functions thereof.

GERAN 120 may be a wireless access network including a base station (e.g., BTS) and a base station controller (BSC). UTRAN 130 may be a wireless access network including a base station (e.g., NodeB) and a radio network controller (RNC). GERAN 120/UTRAN 130 may be located between UE 100 and a core network (e.g., SGSN, MSC, etc.) of second generation (2G)/third generation (3G) mobile communication systems, and transfer data and/or control information therebetween in an asynchronous transfer mode (ATM).

Mobility management entity (MME) 140 may perform at least one of a CS fallback procedure, a combined EPS/IMSI attach procedure, a combined TA/RA update procedure, a detach procedure, and SMS messaging procedures, when interworking with UE 100 and mobile switching center (MSC) 160. Further, MME 140 may establish an interface (e.g., SGs) with MSC 160.

Serving GPRS Supporting Node (SGSN) 150 may provide and manage a packet switched service, and perform at least one of a routing area update (RAU) procedure, a location information registration procedure, and a paging procedure for a mobility management of UE 100 in a packet switched service.

MSC 160 may perform at least one of a CS fallback procedure, a combined EPS/IMSI attach procedure, a combined TA/RA update procedure, a detach procedure, and SMS messaging procedures, in interworking with MME 140. Further, MSC 160 may establish an interface (e.g., SGs) with MME 140.

Meanwhile, UE 100 may be wireless client devices which are capable of transmitting signals to wireless access networks such as E-UTRAN 110, GERAN 120, or UTRAN 130 and receiving signals from wireless access network through a wireless link. Such UE 100 may be referred to as a mobile station (MS), a mobile terminal (MT), an access terminal (AT), a user terminal (UT), a wireless terminal, a subscriber station (SS), a subscriber unit, a wireless device, a wireless transmit/receive unit (WTRU), a mobile node, a station, etc. Furthermore, UE may be, but not limited to, a smart phone, a cell-phone, a personal digital assistant (PDA), a wireless MODEM, a wireless communication device, a portable device, a laptop computer, a desktop computer, a wireless printer, a cordless telephone, a wireless local loop (WLL) station, etc.

As illustrated in FIG. 1, a plurality of interfaces may be established between entities of the wireless networks. "LTE-Uu" interface may be a wireless interface between UE 100 and E-UTRAN 110. "Um" interface may be a wireless interface between UE 100 and GERAN 120. "Uu" interface may be a wireless interface between UE 100 and UTRAN 130. "S1-MME" interface may be an interface between E-UTRAN 110 and MME 140. "Gb" interface may be an interface between GERAN 120 and SGSN 150, and "A" interface may be an interface between GERAN 120 and MSC 160. "Iu-ps" interface may be an interface between UTRAN 130 and SGSN 150. "Iu-cs" interface may be an interface between UTRAN 130 and MSC 160. "S3" interface may be an interface between MME 140 and SGSN 150. "Gs" interface may be an interface between SGSN 150 and MSC 160. "SGs" interface may be an interface between MME 140 and MSC 160. "SGs" interface may be based on the interface "Gs."

The WCDMA/GSM network may include a circuit switched (CS) domain and a packet switched (PS) domain. Referring to FIG. 1, MSC 160 may be included in the CS domain, and SGSN 150 may be included in the PS domain. When UE 100 camps on the WCDMA/GSM network, a CS service (e.g., voice call) may be provided through the CS domain, and a PS service (e.g., IP based services) may be provided through the PS domain. Further, in the WCDMA/GSM network, UE 100 may access the CS domain and the PS domain respectively or simultaneously. A domain specific access control (DSAC) may bar the PS domain or the CS domain based on a network load of the WCDMA/GSM network. Typically, when the network load of the WCDMA/GSM network reaches a predetermined reference value, the PS domain may be barred in order to support a continuity of voice services.

Figure 2:
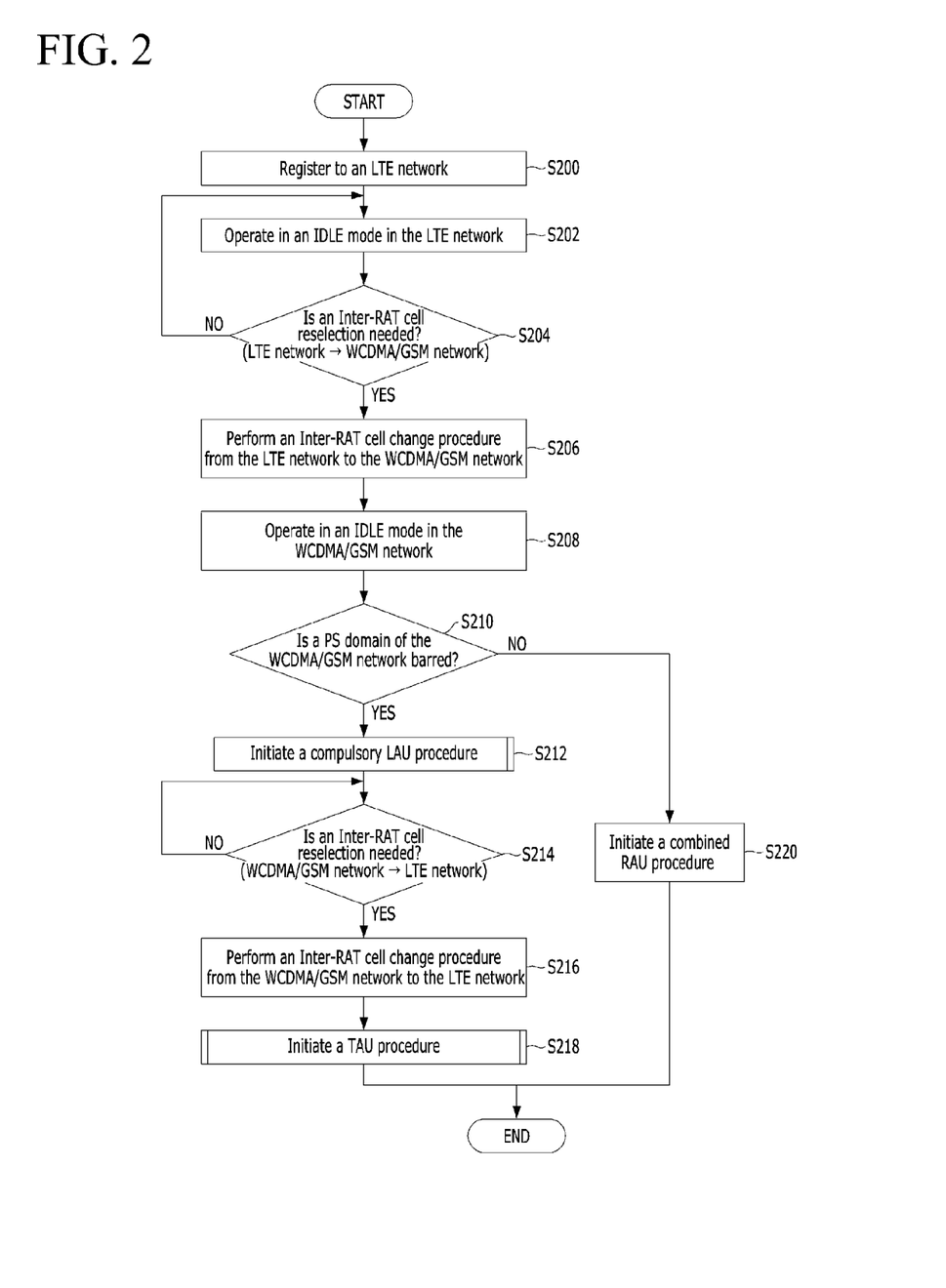
FIG. 2 illustrates providing service continuity between heterogeneous wireless networks in case of performing an Inter-RAT cell change procedure due to an idle mode cell reselection in accordance with at least one embodiment of the present invention.

FIG. 2 illustrates providing service continuity between heterogeneous wireless networks for a case of performing an Inter-RAT cell change procedure due to an idle mode cell reselection in accordance with at least one embodiment of the present invention.

For example, UE 100 may enter a service area of a WCDMA/GSM network through a cell reselection after being registered to an LTE network. Hereinafter, for convenience of explanation, description will be given under the assumption that UE 100 and/or networks support "3rd Generation Partnership Project" (3GPP) Release 8, but the networks do not necessarily support an idle mode signaling reduction (ISR) procedure. Herein, the idle mode may indicate a status where UE 100 is switched on but does not have any established radio resource control (RRC) connection.

As illustrated in FIG. 2, UE 100 may be registered to the LTE network at step S200, and operate in an idle mode in the LTE network at step S202.

At step S204, UE 100 being in the idle mode may determine whether it is necessary to perform an inter-radio access technology (Inter-RAT) cell reselection based on a predetermined reference value such as a default value for a cell reselection or a radio link quality. For example, UE 100 may determine whether to perform the Inter-RAT cell reselection from the LTE network to the WCDMA/GSM network. When the Inter-RAT cell reselection is not necessary (No-S204), UE 100 may return to step S202.

When the Inter-RAT cell reselection is desired (Yes-S204), UE 100 may perform an Inter-RAT cell change procedure from the LTE network to the WCDMA/GSM network in an idle mode at step S206. After the Inter-RAT cell change procedure is performed, UE 100 may operate in an idle mode in the WCDMA/GSM network at step S208.

At step S210, UE 100 may determine whether a packet switched (PS) domain of the WCDMA/GSM network is barred. After the Inter-RAT cell change procedure is performed from the LTE network to the WCDMA/GSM network, the PS domain of the WCDMA/GSM network may be barred by a domain specific access control (DSAC). The DSAC may bar the PS domain or the CS domain based on a network load of the WCDMA/GSM network. When the network load of the WCDMA/GSM network reaches a predetermined reference value, the PS domain may be barred in order to support a continuity of voice services. Further, UE 100 may determine whether the PS domain has been barred, on the basis of system information blocks (e.g., SIB3) which is broadcasted from the WCDMA/GSM network.

Typically, when an Inter-RAT cell change procedure is performed from a LTE network to a WCDMA/GSM network, a PS domain of the WCDMA/GSM network may have already been barred. In this case, MME is typically not able to initiate a normal location area update (LAU) procedure, and general packet radio service (GPRS) mobility management ("GMM") entity is typically not be able to initiate a routing area update (RAU) procedure as described in 3GPP TS 24.008. Further, UE 100 holds a temporary identity used in next update (TIN) value being set to a GUTI value without changing the TIN to a packet-temporary mobile subscriber identity (P-TMSI). In summary, a position of UE 100 is known to the LTE network corresponding to an old network, but is not known to the WCDMA/GSM network corresponding to a new network. Accordingly, paging signals targeted to UE 100 are transferred to the LTE network, and therefore may be lost.

In order to overcome such a disadvantage of the above typical procedure, when the PS domain of the WCDMA/GSM network is barred (Yes-S210), UE 100 may forcibly initiate a normal location area update (LAU) procedure at step S212. For example, UE 100 may transmit a location area update (LAU) request message to MSC 160 in order to avoid a loss of paging signals. When receiving the LAU request message, MSC 160 may perform the normal LAU procedure. Typically, the normal LAU procedure may be an update procedure for a circuit switched (CS) service. The normal LAU procedure will be described in more detail with FIG. 3.

When the PS domain of the WCDMA/GSM network is available (No-S210), UE 100 may perform a combined RAU procedure (e.g., a combined RA/LA update procedure) at step S220. UE 100 may be registered to the CS domain and the PS domain of the WCDMA/GSM network by the combined RAU procedure. For example, in case of the combined RAU procedure, UE 100 may perform an LA update in the CS domain of the WCDMA/GSM network, and perform an RA update in the PS domain of the WCDMA/GSM network.

AT step S214, UE 100 may determine whether it is necessary to perform an Inter-RAT cell reselection in an idle mode. For example, UE 100 may determine whether it is necessary to perform the Inter-RAT cell reselection from the WCDMA/GSM network to the LTE network, based on a predetermined reference value such as a default value for a cell reselection or a radio link quality When the Inter-RAT cell reselection is needed (Yes-S214), UE 100 may perform an Inter-RAT cell change procedure from the LTE network to the WCDMA/GSM network in an idle mode at step S216. At step S210, a link (i.e., "SGs" interface) between MSC 160 and MME 140 may be released due to the normal LAU procedure initiated by UE 100. That is, association between MSC 160 and MME 140 may be removed when MSC 160 receives a LAU request message via "A" or "Iu" interface. Accordingly, even though UE 100 is transferred back to a service area of the LTE network from the WCDMA/GSM network, paging signals targeted to UE 100 may be transferred to the WCDMA/GSM network, and therefore may be lost.

When UE 100 is transferred back to a service area of the LTE network (Yes-S214, and S216), UE 100 may forcibly initiate a tracking area update (TAU) procedure with update type such as "combined TA/LA update with IMSI attach" in order to avoid a loss of paging signals at step S218. For example, UE 100 may transmit a TAU request message to MME 140. The link ("SGs interface") released between MME 140 and MSC 160 may be re-established through the TAU procedure. The TAU procedure will be described in more detail with FIG. 6.

Figure 3:
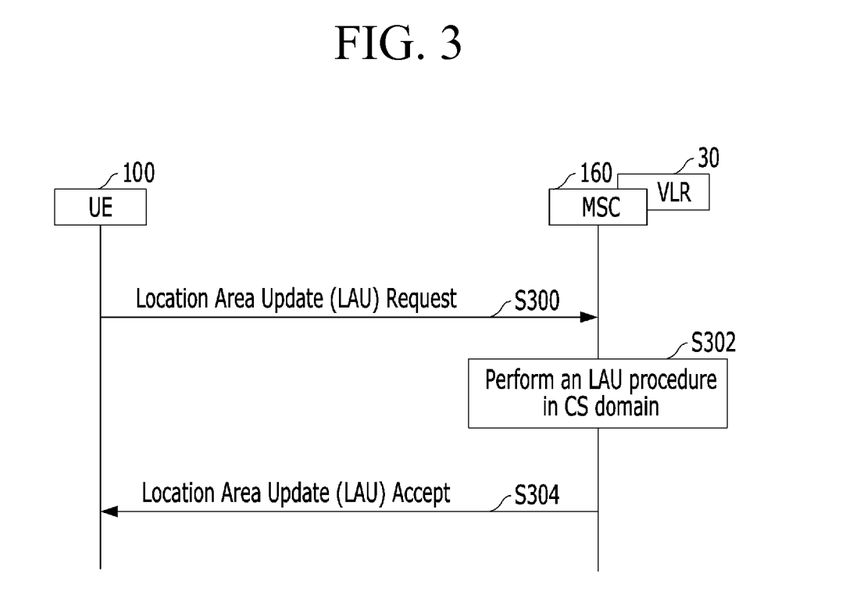
FIG. 3 illustrates performing a location area update (LAU) procedure in a CS domain of a WCDMA or GSM network in accordance with at least one embodiment of the present invention.

FIG. 3 illustrates performing a location area update (LAU) procedure in a CS domain of a WCDMA or GSM network in accordance with at least one embodiment of the present invention. Particularly, FIG. 3 illustrates the normal location area update (LAU) procedure (S212).

Referring to FIG. 3, UE 100 may transmit the LAU request message to MSC 160 to trigger a normal LAU procedure at step S300. Herein, the LAU request message may include at least one of a location area update (LAU) type, a ciphering key sequence number (CKSN), a location area identifier (LAI), and a UE identifier (UE ID). The location area update (LAU) type may be one of a normal location area update, a periodic location area update, and an IMSI attach. For example, the LAU request message may include bits (e.g., "00") indicating a normal location area update (LAU) as LAU type information.

At step S302, when receiving the LAU request message, MSC 160 may perform the LAU procedure in the CS domain of the WCDMA/GSM network, in interworking with visitor location register (VLR) 30.

At step S304, after the LAU procedure is performed, MSC 160 may transmit a location area update (LAU) accept message to UE 100 in response to the LAU request message at step S302. Herein, the LAU accept message may include new LAI information. Furthermore, when receiving the LAU request message from UE 100, MSC 160 and/or VLR 30 may perform at least one of an identification procedure, an authentication procedure, and a security mode configuration procedure before transmitting the LAU accept message to UE 100.

Figure 4:
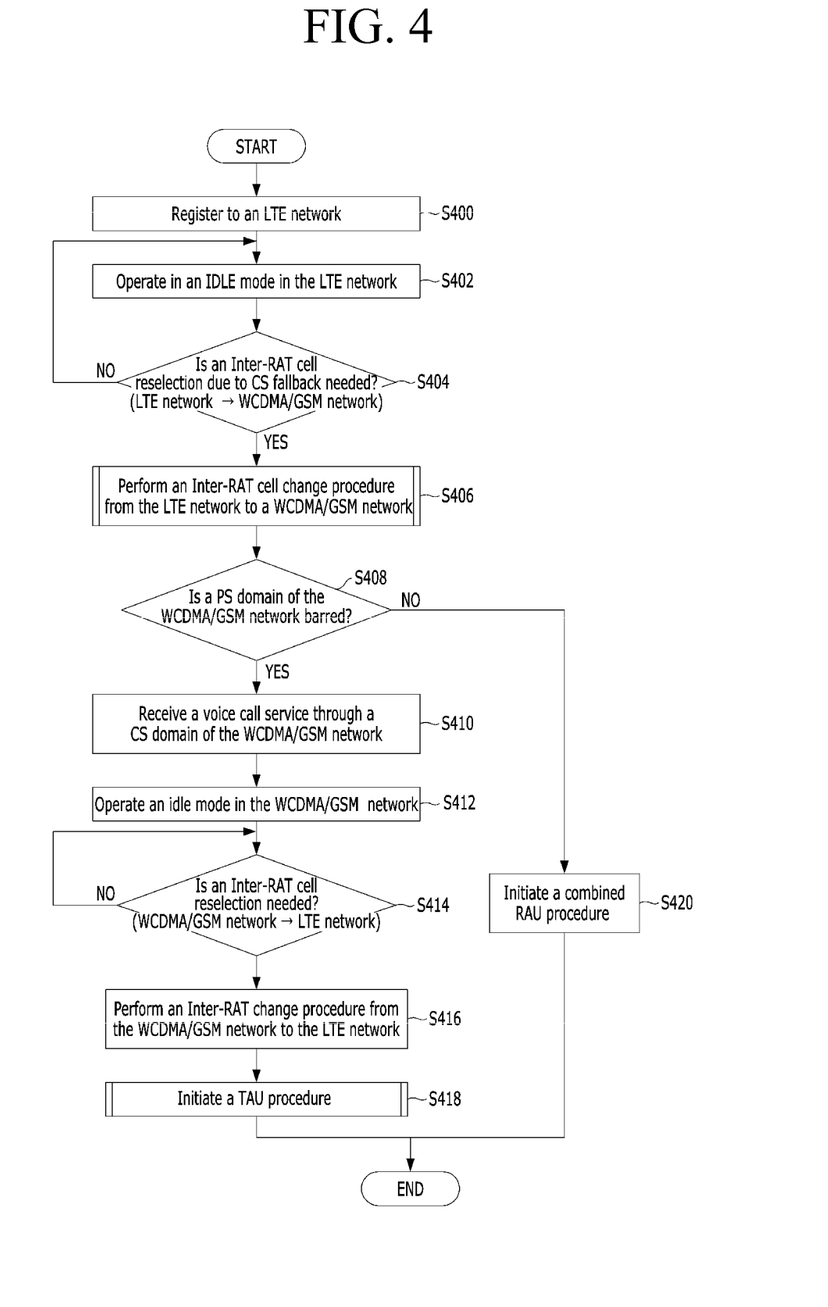
FIG. 4 illustrates providing service continuity between heterogeneous wireless networks in case of performing an Inter-RAT cell change procedure due to a CS fallback, in accordance with at least one embodiment of the present invention.

FIG. 4 illustrates providing service continuity between heterogeneous wireless networks in case of performing an Inter-RAT cell change procedure due to a CS fallback, in accordance with at least one embodiment of the present invention.

For example, UE 100 may enter service area of a WCDMA network or a GSM network (hereinafter referred to as "a WCDMA/GSM network") through circuit-switched (CS) fallback after being registered to an LTE network, and then being transferred back to the LTE network by an Inter-RAT cell reselection.

As illustrated in FIG. 4, UE 100 may be registered to an LTE network at step S400, and operate in an idle mode in the LTE network at step S402. Herein, the idle mode may indicate a status where UE 100 is switched on but does not have any RRC connection.

At step S404, UE 100 being in the idle mode may determine whether it is necessary to perform an Inter-RAT cell reselection due to CS fallback. Herein, the Inter-RAT cell reselection due to CS fallback may be a cell change procedure from the LTE network to the WCDMA/GSM network. When the Inter-RAT cell reselection is not necessary (No-S404), UE 100 may return to step S402.

When the Inter-RAT cell selection due to CS fallback is desired (Yes-S404), UE 100 may perform an Inter-RAT cell change procedure from the LTE network to the WCDMA/GSM network at step S406. The Inter-RAT cell change procedure is triggered due to a CS fall request. During the Inter-RAT cell change procedure, UE 100 may be implicitly registered to a CS domain of the WCDMA/GSM network. This procedure may include to implicitly register UE 100 to a circuit switched (CS) domain of the WCDMA/GSM network. The registration of UE 100 in the Inter-RAT cell change procedure will be described in more detail with FIG. 5.

As described above, in case that UE 100 performs the Inter-RAT cell change procedure from the LTE network to the WCDMA/GSM network through CS fallback, UE 100 may be implicitly registered to the CS domain of the WCDMA/GSM network. However, UE 100 may not be registered to a PS domain of the WCDMA/GSM network by DSAC. The DSAC may bar the PS domain or the CS domain based on a network load of the WCDMA/GSM network. When the network load of the WCDMA/GSM network reaches a predetermined reference value, the PS domain of the WCDMA/GSM network may be barred in order to support a continuity of voice services.

Furthermore, when an Inter-RAT cell change procedure due to CS fallback is performed from the LTE network to the WCDMA/GSM network, the PS domain of the WCDMA/GSM network may have already been barred by the DSAC, In this case, general packet radio service (GPRS) mobility management ("GMM") entity is typically not able to initiate a routing area update (RAU) procedure. UE 100 typically holds a TIN value being set to a GUTI value without changing the TIN to a packet-temporary mobile subscriber identity (P-TMSI).

Accordingly, at step S408, UE 100 may determine whether the PS domain of the WCDMA/GSM network is barred. Particularly, UE 100 may determine whether the PS domain of the WCDMA/GSM network is barred, based on system information blocks (e.g., SIB3) broadcast from the WCDMA/GSM network.

When the PS domain of the WCDMA/GSM network is available (i.e., not barred) (No-S408), UE 100 may perform a combined RAU procedure (e.g., a combined RA/LA update) at step S420. UE 100 may be registered to the CS domain and the PS domain of the WCDMA/GSM network by the combined RAU procedure.

Meanwhile, even though the PS domain of the WCDMA/GSM network is barred (Yes-S408), UE 100 may receive a voice call service through the circuit switched (CS) domain of the WCDMA/GSM network at Step S410. At step S412, UE 100 may operate in an idle mode in the WCDMA/GSM network after a voice call service procedure is performed.

UE 100 may determine whether it is necessary to perform an Inter-RAT cell reselection in an idle mode at step S414. For example, UE 100 may determine whether it is necessary to perform the Inter-RAT cell reselection from the WCDMA/GSM network to the LTE network, based on a predetermined reference value such as a default value for a cell reselection, or a radio link quality.

When the Inter-RAT cell reselection is needed (Yes-S414), UE 100 may perform an Inter-RAT cell change procedure from LTE network to the WCDMA/GSM network, in an idle mode at step S416.

Typically, even though UE 100 is transferred back to the LTE network from the WCDMA/GSM network, paging signals targeted to UE 100 may be transferred to the WCDMA/GSM network. Paging signals targeted to UE 100 may not be transferred to the LTE network, and therefore the paging signals targeted to UE 100 may be lost.

Accordingly, when UE 100 is transferred back to a service area of the LTE network (Yes-S414, and S416), UE 100 may forcibly initiate a tracking area update (TAU) procedure with update type such as "combined TA/LA update with IMSI attach" in order to avoid a loss of paging signals at step S418. For example, UE 100 may transmit a TAU request message to MME 140. The link ("SGs interface") released between MME 140 and MSC 160 may be re-established through the TAU procedure. The TAU procedure will be described in more detail with FIG. 6.

Figure 5:
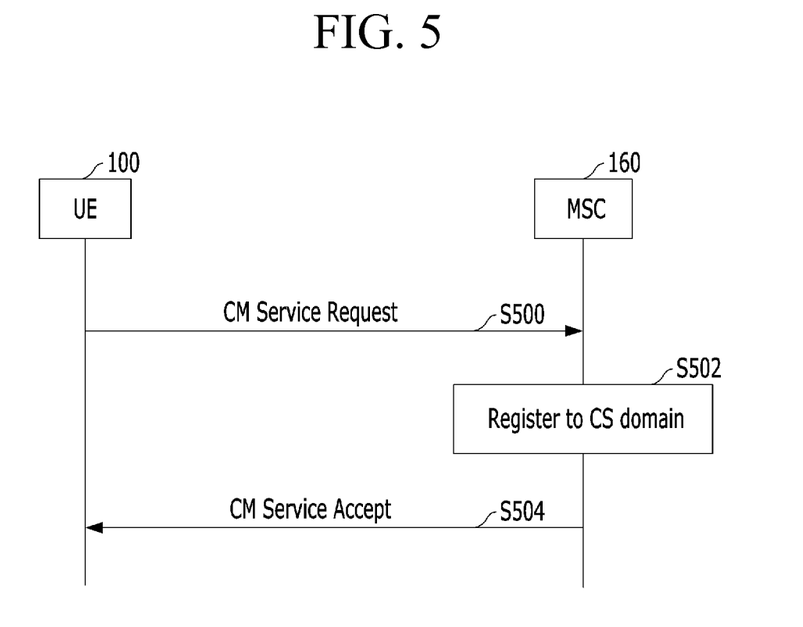
FIG. 5 illustrates performing an implicit registration of UE in an Inter-RAT cell change procedure due to a CS fallback in accordance with at least one embodiment of the present invention.

FIG. 5 illustrates performing an implicit registration of UE in an Inter-RAT cell change procedure due to a CS fallback in accordance with at least one embodiment of the present invention. Particularly, FIG. 5 illustrates registering UE 100 to the CS domain of the WCDMA/GSM network, in the Inter-RAT cell change procedure (S406). That is, FIG. 5 illustrates some steps included in an Inter-RAT cell change procedure (S406).

Referring to FIG. 5, UE 100 may transmit a connection management (CM) service request message to MSC 160 at step S500.

At step S502, MSC 160 may register UE 100 to the CS domain of the WCDMA/GSM network. The Inter-RAT cell change procedure is triggered due to a CS fall request. During the Inter-RAT cell change procedure, UE 100 may be implicitly registered to a CS domain of the WCDMA/GSM network by transmitting the CM request message to MSC 160. Accordingly, a location of UE 100 may be managed in the CS domain of the WCDMA/GSM network. In this case, paging signals targeted to UE 100 may be transferred to the WCDMA/GSM network.

At step S504, MSC 160 may transmit a CM service accept message to UE 100 in response to the CM request message.

Figure 6:
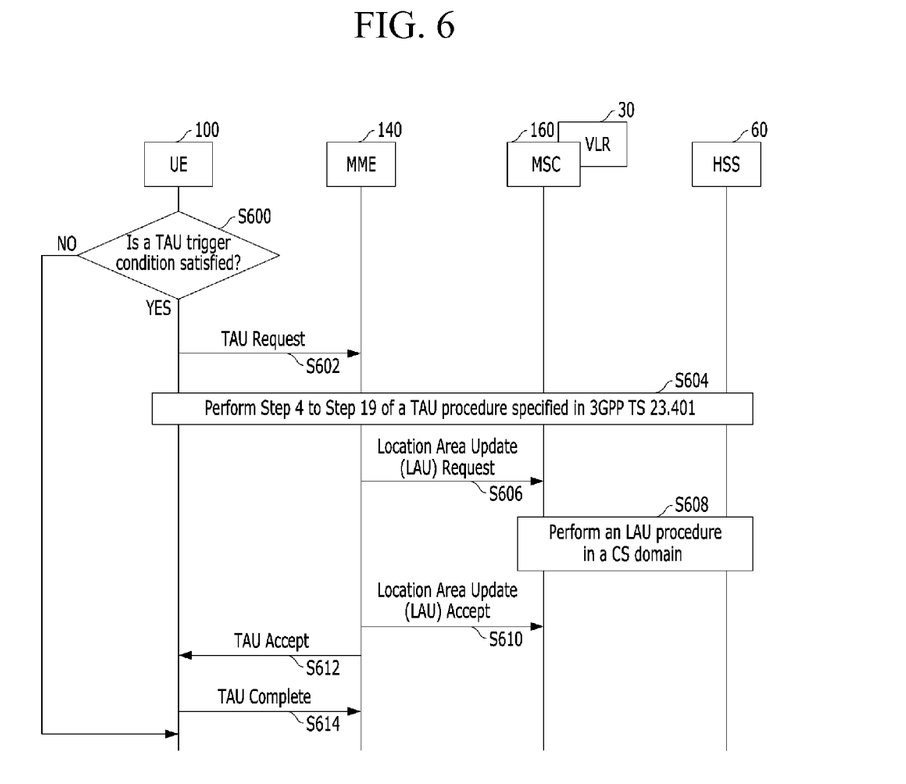
FIG. 6 illustrates performing a TAU procedure in accordance with at least one embodiment of the present invention.

FIG. 6 illustrates performing a TAU procedure in accordance with at least one embodiment of the present invention. Particularly, FIG. 6 illustrates performing the TAU procedure initiated by UE 100 at step 218 and step 418.

Referring to FIG. 6, UE 100 may determine whether a TAU trigger condition is satisfied at step S600. Herein, TAU trigger condition may be satisfied at least one of (a) when UE 100 performs an Inter-RAT cell change procedure in an idle mode from an LTE network to a WCDMA/GSM network with a barred PS domain and then is back to the LTE network, as described in FIG. 2; (b) when UE 100 performs an Inter-RAT cell change procedure from an LTE network to the WCDMA/GSM network with the barred PS domain due to a CS fallback and then is back to the LTE network, as described in FIG. 4; (c) when UE 100 fails to perform an RAU procedure in a reselected WCDMA/GSM network due to such reasons as an unavailable PS domain; and (d) when a TIN of UE 100 has a GUTI value even though an Inter-RAT cell change has been performed from the WCDMA/GSM network to the LTE network. Herein, in cases of the conditions (a) to (c), UE 100 may fail to perform an RAU procedure in the PS domain of the WCDMA/GSM network.

When the TAU trigger condition is satisfied (Yes-S600), UE 100 may determine to perform a TAU procedure, and then initiate the TAU procedure. For example, UE 100 may initiate the TAU procedure by transmitting a TAU request message including an update type to MME 140 at step S602. Herein update type may indicate that this is a combined TA/LA update with IMSI attach Request. Further, when UE 100 enters service area of the WCDMA/GSM network and a location of UE is changed in the service area of the WCDMA/GSM network, UE 100 may transmit the TAU request message to a new MME corresponding to a new location.

At step S604, some steps of the TAU procedure may be performed between UE 100 and network elements such as MME 140, MSC 160, VLR 30, or Home Subscriber Server (HSS) 60. For example, step 4 to step 19 of the TAU procedure may be performed as specified in 3GPP TS 23.401 ("General Packet Radio Service (GPRS) enhancements for Evolved Universal Terrestrial Radio Access Network (E-UTRAN) access").

When the TAU procedure is performed, MME 100 may transmit a location area update (LAU) request message to MSC 160/VLR 30 at step S606.

At step S608, when receiving the LAU update request message from MME 140, MSC 160/VLR 30 may perform a location area update (LAU) procedure in the CS domain of the WCDMA/GSM network, in interworking with HSS 60.

At step S610, when the LAU procedure in the CS domain the WCDMA/GSM network is performed, MSC 160/VLR 30 may an LAU accept message to MME 140 in response to the LAU update request message.

At step S612, when receiving the LAU accept message from MSC 160/VLR 30, MME 140 may transmit a TAU accept message to UE 100. Herein, the TAU accept message may inform the recipient that a tracking area update has succeeded.

At step S614, UE 100 may transmit a TAU complete message to MME 140 in response to the TAU accept message.

Figure 7:
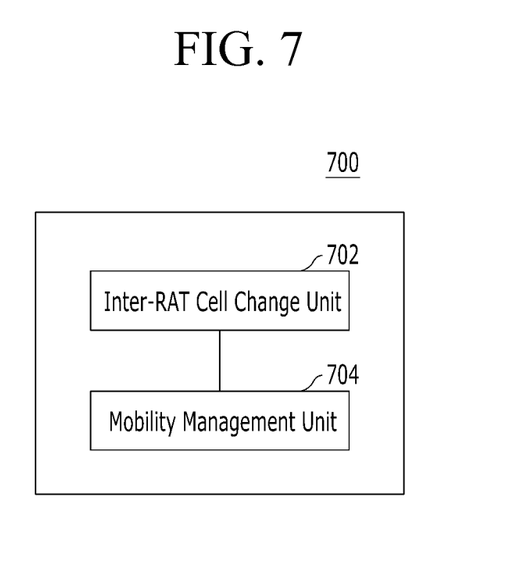
FIG. 7 illustrates an apparatus for providing service continuity between heterogeneous wireless networks in accordance with at least one embodiment of the present invention.

FIG. 7 illustrates an apparatus for providing service continuity between heterogeneous wireless networks in accordance with at least one embodiment of the present invention.

The apparatus may be illustrated as an independent apparatus in FIG. 7, but the present invention is not limited thereto. For example, the apparatus may be included in user equipment such as UE 100.

As illustrated in FIG. 7, apparatus 700 may include Inter-RAT cell change unit 702 and mobility management unit 704 in accordance with at least one embodiment of the present invention. Apparatus 700 may perform operations described above with reference to FIG. 1 to FIG. 6. Accordingly, the detailed description thereof will be omitted herein. Each constituent element of apparatus 700 will be briefly described.

Inter-RAT cell change unit 702 may perform an Inter-RAT cell change procedure between a packet switched network (e.g., an LTE network) and a circuit switched network (e.g., a WCDMA network, and a GSM network). Herein, the circuit switched network may include a packet switched (PS) domain for a packet switched service and a circuit switched (CS) domain for a circuit switched service. Either the PS domain or the CS domain may be barred based on a network load of the WCDMA/GSM network by a DSAC. For example, when the network load of the WCDMA/GSM network reaches a predetermined reference value, the PS domain may be barred in order to support a continuity of voice services. Further, UE 100 may determine whether the PS domain has been barred, on the basis of system information blocks (e.g., SIB3) which is broadcasted from the WCDMA/GSM network.

For example, Inter-RAT cell change unit 702 may perform an Inter-RAT cell change procedure from the LTE network to the WCDMA network or the GSM network due to a cell reselection or a CS fallback. Also, Inter-RAT cell change unit 702 may perform an Inter-RAT cell change procedure from the WCDMA network or the GSM network to the LTE network due to the cell reselection. Since such operation was already described with reference to FIG. 2 and FIG. 4, the detailed description thereof is omitted herein.

Mobility management unit 704 may initiate at least one of an LAU procedure and a TAU procedure in order to avoid a loss paging signals targeted to UE 100 when a PS domain of the circuit switched network is barred. For example, mobility management unit 704 may transmits an LAU request message to a corresponding MSC 160 when the Inter-RAT cell change procedure is performed in an idle mode from the LTE network to the WCDMA/GSM network. Meanwhile, mobility management unit 704 may transmit a CM service request message to a corresponding MSC 160 when the Inter-RAT cell change procedure is performed from the LTE network to the WCDMA/GSM network by a circuit switched (CS) fallback. Since such operation was already described with reference to FIG. 2 to FIG. 5, the detailed description thereof is omitted herein.

Further, mobility management unit 704 may perform the TAU procedure based on a TAU trigger condition when the Inter-RAT cell change procedure is performed in an idle mode from the WCDMA/GSM network to the LTE network. Herein, the TAU trigger condition is satisfied with at least one of when an RAU is not performed in the PS domain of the WCDMA/GSM network; and when a TIN has a GUTI value. Since such operation was already described with reference to FIG. 6, the detailed description thereof is omitted herein.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing service continuity between heterogeneous networks accessed by user equipment, the method comprising:
    performing a first cell change procedure from a packet switched network to a circuit switched network in a first idle mode, wherein the circuit switched network includes a packet switched domain and a circuit switched domain;
    determining availability of the packet switched domain and the circuit switched domain of the circuit switched network;
    initiating a combined routing area update (RAU) when the packet switched domain and the circuit switched domain of the circuit switched network are available; and
    initiating a location area update (LAU) in the circuit switched domain when the packet switched domain of the circuit switched network is in a barred state.

2. The method of claim 1, wherein the packet switched network is a Long Term Evolution (LTE) network, and the circuit switched network is at least one of a wideband code division multiple access (WCDMA) network and a global system for mobiles (GSM) network.

3. The method of claim 2, wherein the initiating an LAU includes:
    transmitting, by the user equipment, a location area update request message to a corresponding mobile switching center (MSC).

4. The method of claim 1, wherein the determining is based on a system information block broadcasted from the circuit switched network.

5. The method of claim 1, wherein the packet switched domain is barred by a domain specific access control (DSAC).

6. The method of claim 2, further comprising:
    performing a second cell change procedure from the circuit switched network to the packet switched network in a second idle mode; and
    initiating a tracking area update (TAU).

7. The method of claim 6, wherein the initiating a TAU includes transmitting a TAU message to a corresponding mobility management entity (MME).

8. The method of claim 2, further comprising:
    performing a second cell change procedure from the circuit switched network to the packet switched network in a second idle mode;
    identifying a temporary identity used in next update (TIN); and
    initiating a tracking area update (TAU) when the TIN has a globally unique temporary identity (GUTI) value.

9. The method of claim 8, wherein the initiating a TAU includes transmitting a TAU request message to a corresponding mobility management entity (MME).

10. A method of providing service continuity between heterogeneous networks accessed by user equipment, the method comprising:
    performing a first cell change procedure through a circuit switched (CS) fallback from a packet switched network to a circuit switched network, wherein (i) the circuit switched network includes a packet switched domain and a circuit switched domain, and (ii) the packet switched domain of the circuit switched network is barred;
    initiating a registration of the user equipment to the circuit switched domain of the circuit switched network;
    performing a second cell change procedure from the circuit switched network to the packet switched network in an idle mode;
    determining whether a trigger condition for a tracking area update (TAU) is satisfied; and
    initiating the TAU when the trigger condition is satisfied.

11. The method of claim 10, wherein the packet switched network is a Long Term Evolution (LTE) network, and the circuit switched network is at least one of a wideband code division multiple access (WCDMA) network and a global system for mobiles (GSM) network.

12. The method of claim 11, wherein the initiating a registration of the user equipment includes:
    transmitting, by the user equipment, a connection management (CM) service request message to a corresponding mobile switching center (MSC).

13. The method of claim 10, wherein the trigger condition includes at least one of:
    when the packet switched domain of the circuit switched network is barred by a domain specific access control (DSAC); and
    when a temporary identity used in next update (TIN) has a globally unique temporary identity (GUTI) value.

14. The method of claim 13, wherein whether the packet switched domain is barred is determined based on a system information block broadcast from the circuit switched network.

15. The method of claim 10, wherein the initiating the TAU includes:
transmitting, by the user equipment, a TAU message to a corresponding mobility management entity (MME).

16. An apparatus for providing service continuity between heterogeneous networks, the apparatus comprising:
at least one hardware processor that executes:
a cell change unit configured to perform a cell change procedure between a packet switched network and a circuit switched network, wherein the circuit switched network includes a packet switched domain and a circuit switched domain; and
a mobility management unit configured to initiate at least one of a location area update (LAU) and a tracking area update (TAU) when the packet switched domain of the circuit switched network is in a barred state; and
at least one memory which stores program instructions required to perform at least one of the cell change procedure, the location area update (LAU), and the tracking area update (TAU), and is configured to provide the program instructions to the at least one hardware processor,
wherein in a case that the cell change procedure is performed in a first idle mode from the packet switched network to the circuit switched network, the mobility management unit is configured to:
initiate a combined routing area update (RAU) when the packet switched domain and the circuit switched domain of the circuit switched network are available; and
initiate the LAU in the circuit switched domain when the packet switched domain of the circuit switched network is in the barred state.

17. The apparatus of claim 16, wherein the mobility management unit is configured to transmit an LAU request message to a corresponding mobile switching center (MSC) when the cell change procedure is performed in the first idle mode from the packet switched network to the circuit switched network.

18. The apparatus of claim 16, wherein the mobility management unit is configured to transmit a connection management (CM) service request message to a corresponding mobile switching center (MSC) when the cell change procedure is performed from the packet switched network to the circuit switched network by a circuit switched (CS) fallback.

19. The apparatus of claim 16, wherein the mobility management unit is configured to perform the TAU based on a TAU trigger condition when the cell change procedure is performed in a second idle mode from the circuit switched network to the packet switched network.

20. The apparatus of claim 19, wherein the TAU trigger condition is satisfied with at least one of:
when an routing area update (RAU) is not performed in the packet switched domain of the circuit switched network; and
when a temporary identity used in next update (TIN) has a globally unique temporary identity (GUTI) value.

* * * * *